Nov. 9, 1965  D. WOLFORD ETAL  3,216,664
TRACTOR POWERED SPRAYER
Filed April 23, 1963  5 Sheets-Sheet 1
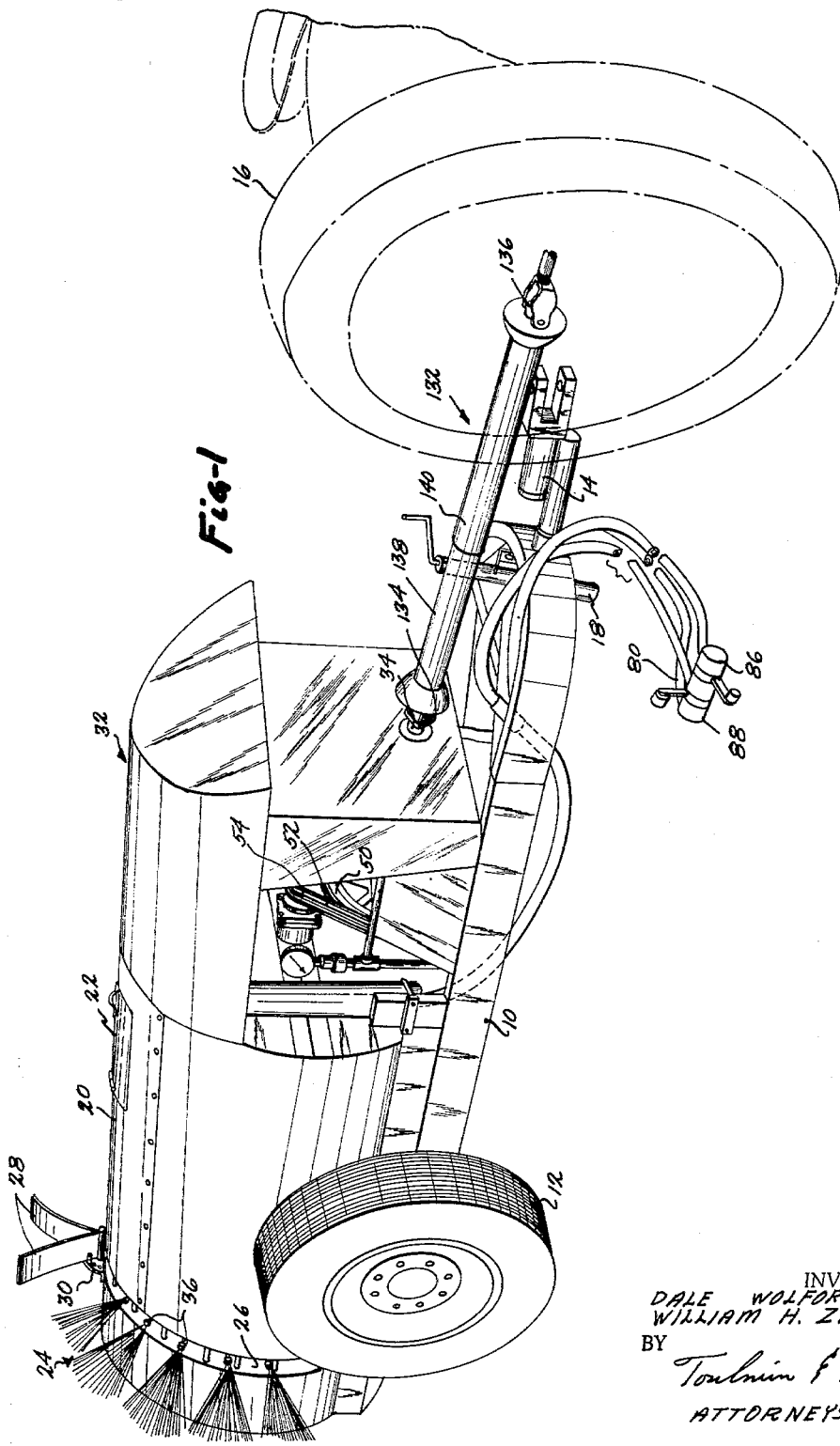
INVENTORS
DALE WOLFORD
WILLIAM H. ZEHNER
BY
Toulmin & Toulmin
ATTORNEYS Nov. 9, 1965   D. WOLFORD ETAL   3,216,664
TRACTOR POWERED SPRAYER
Filed April 23, 1963   5 Sheets-Sheet 2
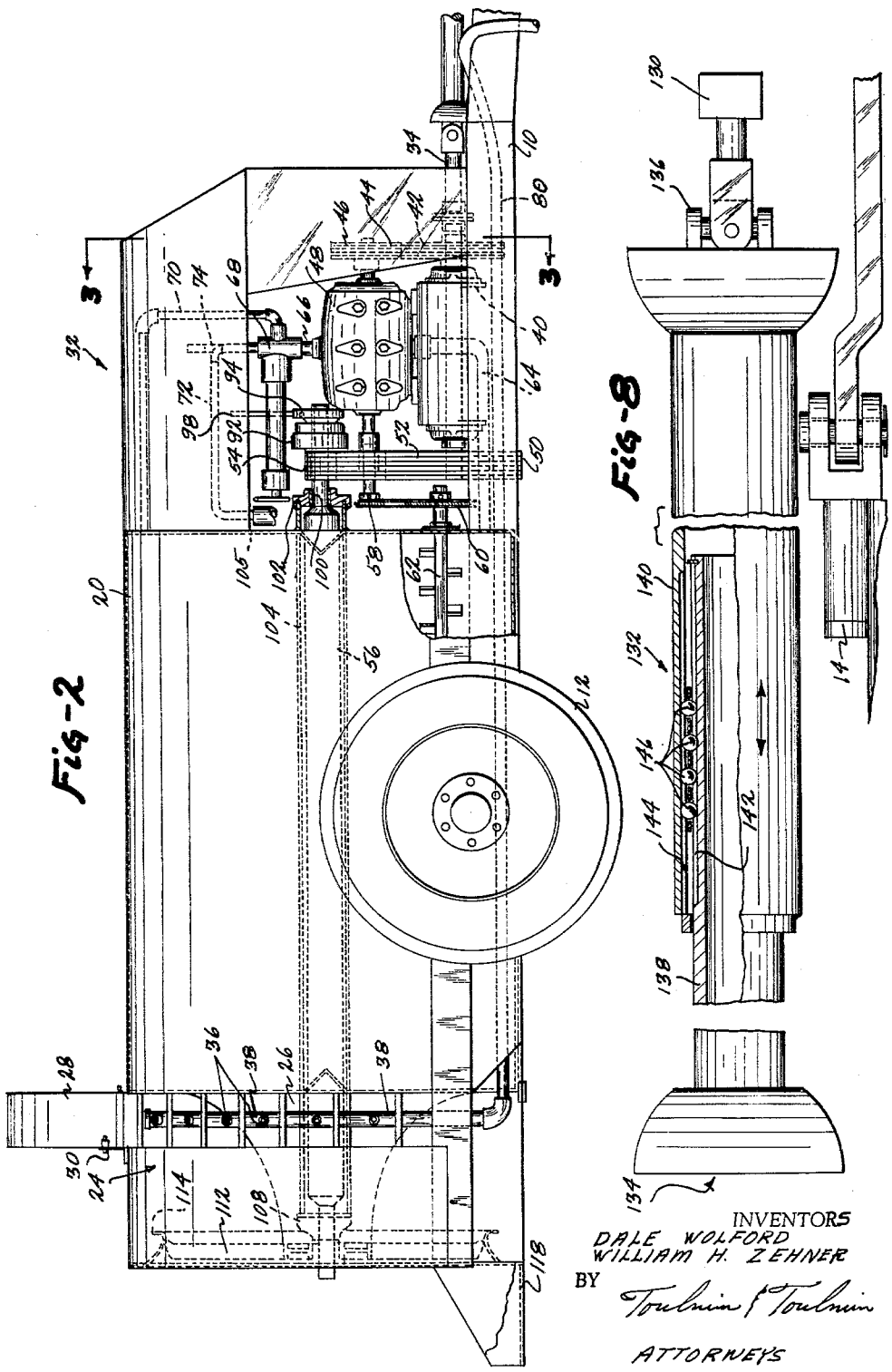
INVENTORS
DALE WOLFORD
WILLIAM H. ZEHNER
BY
Toulmin & Toulmin
ATTORNEYS Nov. 9, 1965    D. WOLFORD ETAL    3,216,664
TRACTOR POWERED SPRAYER
Filed April 23, 1963    5 Sheets-Sheet 3
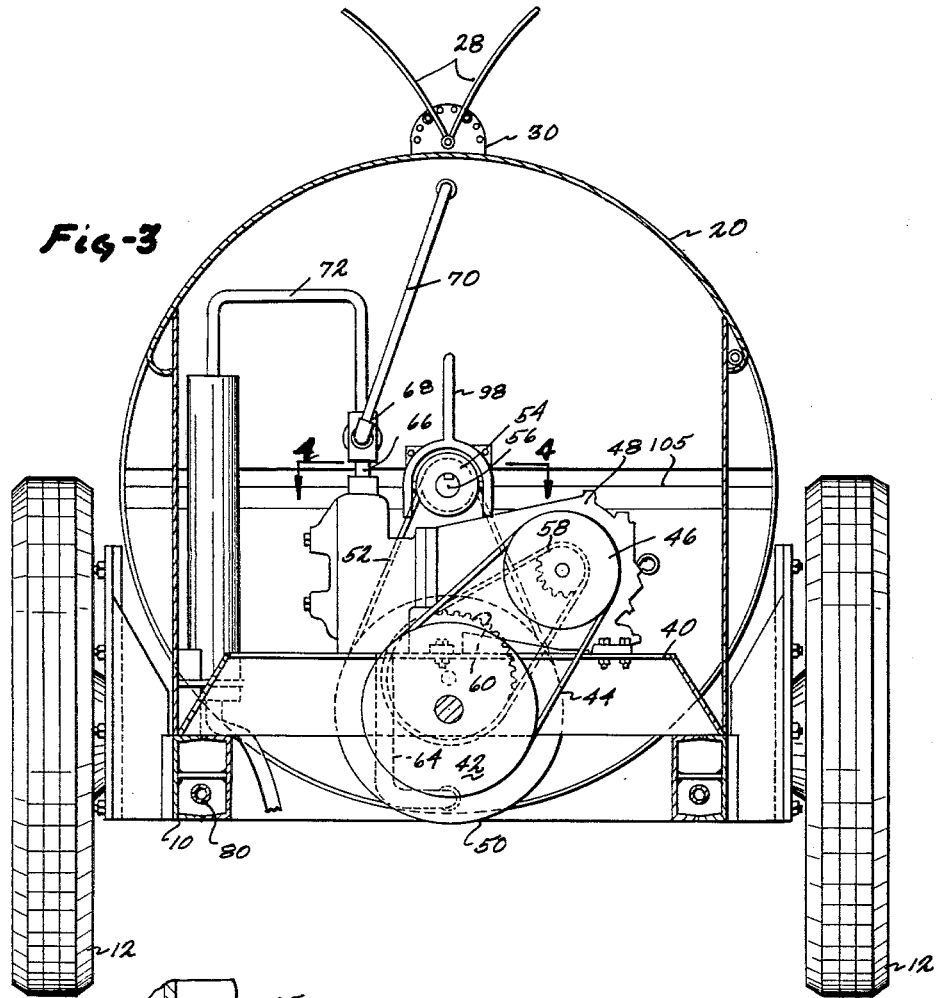
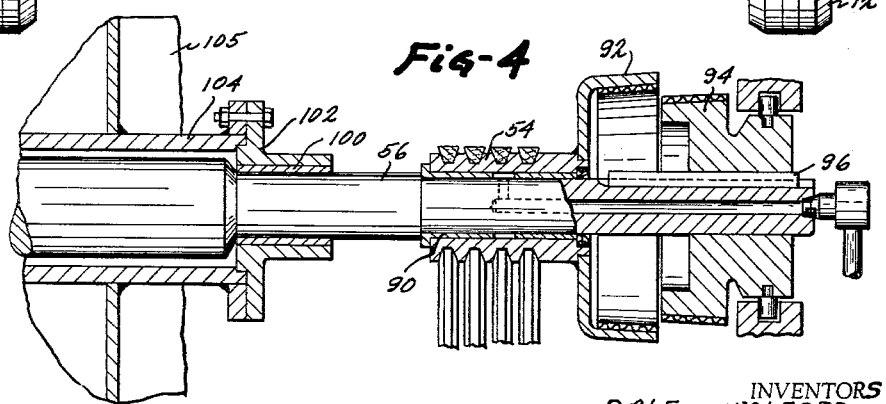
INVENTORS
DALE WOLFORD
WILLIAM H. ZEHNER
BY Toulmin & Toulmin
ATTORNEYS

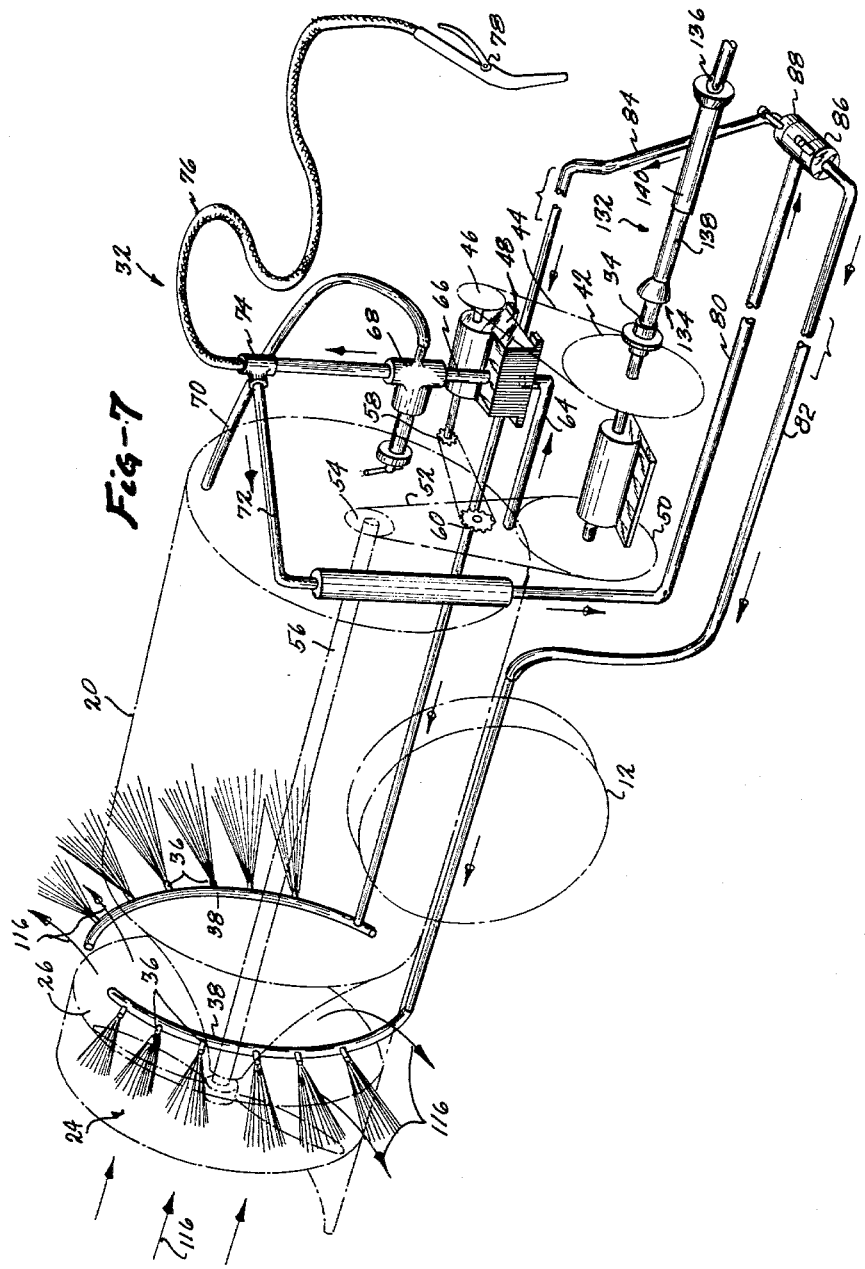

United States Patent Office 3,216,664
Patented Nov. 9, 1965

3,216,664
TRACTOR POWERED SPRAYER
Dale Wolford and William H. Zehner, Ashland, Ohio, assignors to The F. E. Myers & Bro. Co., Ashland, Ohio, a corporation of Ohio
Filed Apr. 23, 1963, Ser. No. 274,977
1 Claim. (Cl. 239—77)

This invention relates to sprayers for the spraying of liquid and powdered material and is particularly concerned with an orchard or row crop sprayer and dusting device of the type wherein a large volume of air is moved at high velocity and carries with it the material that is to be deposited on the vegetation being treated. More particularly still the present invention relates to equipment of the nature referred to which is powered by the power take off shaft of a tractor.

Spraying equipment and dusting equipment fall into a well-known class and are widely used in connection with agriculture and in orchards. This equipment is for orchard use and for large agricultural establishments, taking the form of a relatively large piece of equipment mounted on its own chassis and carrying the material to be dispensed, and having fan or blower means for creating a large volume high velocity air blast. Ordinarily equipment of this nature has its own power plant mounted on the chassis which drives the fan or blower means, and which also powers the pump which pumps the liquid being dispensed into the air stream and which power plant also operates any other auxiliaries associated with the piece of equipment. Because of the inclusion of the power plant in the spraying or dusting equipment structure, this equipment tends to be quite large and expensive, and is sometimes so long that it becomes difficult to maneuver the equipment in crowded regions, such as, for example, in making a turn at the end of a crop row or a row of trees being treated.

With the foregoing general comments in mind, a primary object of the present invention is the provision of an improved compact device for spraying and dusting operations which avoids the drawbacks referred to above.

Another object of this invention is the provision of equipment for spraying and dusting crops and trees in which the power for operating the equipment is derived from the power take off shaft of the tractor drawing the equipment.

A still further object of this invention is the provision of a tractor drawn spraying and dusting device in which the entire control of the equipment can be accomplished by the tractor driver from the seat of the tractor.

It is also an object of this invention to provide a tractor drawn spraying and dusting device in which all of the power for operating the various auxiliaries of the device, such as the fan or blower and the pump and agitator in the materials tank are driven from the power take off shaft with each auxiliary being driven at the proper speed.

Still another object of this invention is the provision of a tractor drawn sprayer or duster in which the power for operating the device making up the spray is derived from the power take off shaft of the tractor and wherein the connection leading from the power take off shaft of the tractor to the device is collapsible and extensible whereby short turns can be made by the tractor without any difficulty due to the drive connection leading to the spraying equipment.

These and other objects and advantages of this invention will become more apparent upon reference to the following specification taken in connection with the accompanying drawings, in which:

FIGURE 1 is a perspective view of the spraying equipment according to the present invention showing the drawing tractor in dot-dash outline.

FIGURE 2 in a side elevational view of the equipment.

FIGURE 3 is a sectional view indicated by line 3—3 on FIGURE 2, and looking in at the sprayer from the driver end thereof.

FIGURE 4 is a sectional view indicated by line 4—4 on FIGURE 3 showing the drive into the shaft for the blower and illustrating a clutch employed in connection therewith.

FIGURE 7 is a diagrammatic perspective view showing the entire sprayer unit and the several parts thereof with portions of the sprayer being drawn in dot-dash outline, and FIGURE 8 is a fragmentary view partly broken away showing the jointed collapsibe and extensible propeller shaft for connecting the power take off of the tractor with the power input shaft of the sprayer.

Figure 6:
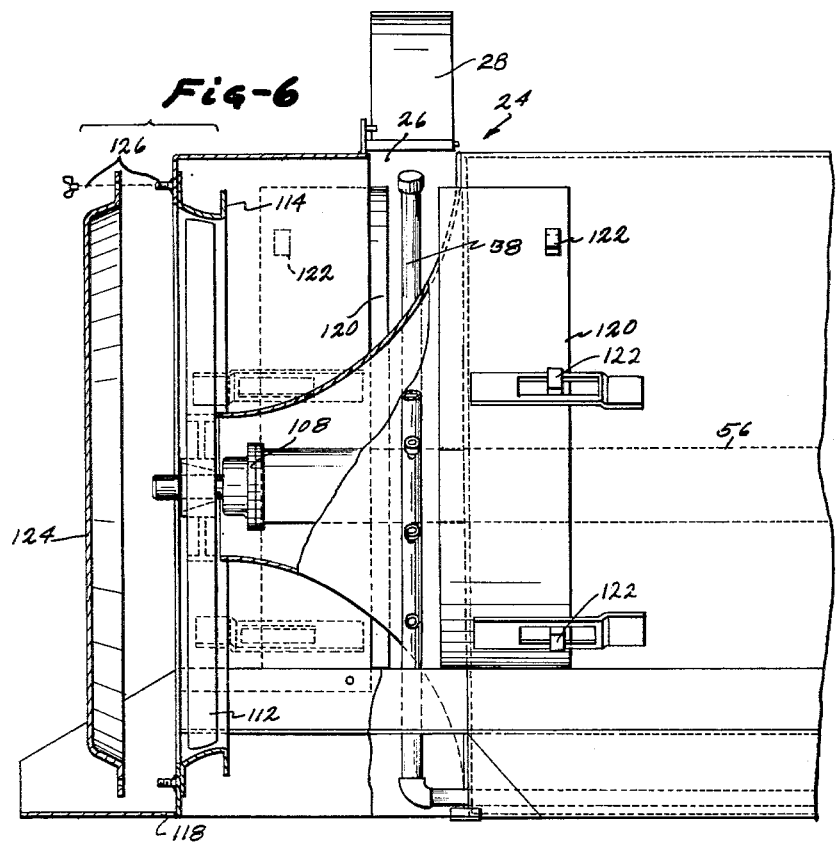
FIGURE 6 is a view drawn at somewhat enlarged scale and being in the form of a partial section through the sprayer in the region of the blower end and showing adjustable members that can be employed for controlling the size of the air outlet and also showing a cover member for covering the air inlet from the blower.
Figure 5:
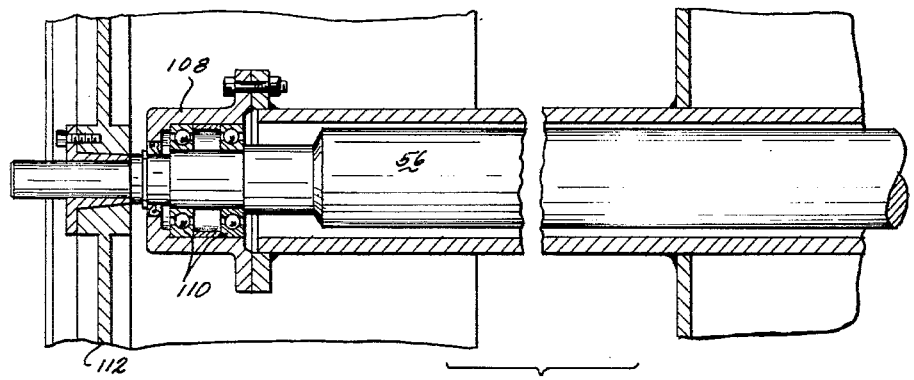
FIGURE 5 is a fragmentary section similar to FIGURE 4 but showing the blower shaft at the blower end thereof.

Referring to the drawings somewhat more in detail, the sprayer according to the present invention comprises a chassis 10 having support wheels by means of which it is supported for being drawn over the ground. The front end of chassis 10 has connected thereto a hitch member 14 extending forwardly from the chassis for connection with any suitable hitch arrangement of a drawing tractor, which is indicated in dot-dash outlined in fragmentary form at 16 in FIGURE 1. The front end of the chassis may also include the adjustable leg element 18 which can be availed of for supporting the chassis of the sprayer in substantially horizontal position when it is not connected to the tractor.

Mounted on chassis 10 is a materials tank 20 for receiving liquid, such as insecticides and fungicides, or any other treatment liquid which is to be delivered to vegetation. This tank may have a filling hole covered by a lid 22. At the rear end of the chassis there is supported the blower means generally indicated at 24 in FIGURE 1 and which is operable for delivering a high velocity high volume blast of air through a substantially annular opening 26. This will produce a fan-shaped blast extending substantially straight out from the side of the sprayer so that material entrained in the air blast will be conveyed sufficiently to the foliage. As will be seen hereinafter the air blast can be confined to one side of the sprayer or can emanate from both sides thereof, and the supply of material to the blast on opposite sides of the sprayer can be individually controlled so that two rows can be sprayed at one time or one row on one side only of the sprayer can be treated. Furthermore, the upper portion of the opening 26 is adapted for being variably restricted by the curved vanes or deflector plates 28 which can be adjusted about a plate 30 and locked in position thereto so that the character of the blast issuing from either or both sides of the sprayer can be adjusted to conform to the type of vegetation being treated. For trees and other high growing vegetation the deflector members 28 would positioned in an upper position, whereas for lower growing vegetation these members would be adjusted downwardly to prevent the blast from being dispersed uselessly above the vegetation.

At the tractor end of the chassis 10 there is a compartment generally designated at 32 in which is located the pump that pumps liquid from tank 20 to the nozzle in the end discharge opening and within which compartment is also located a speed reducer and drive belt interconnecting the several elements to be driven with an input shaft 34 leading into the front of the compartment 32.

The aforementioned nozzles have the reference numeral 36 in FIGURE 1 and these nozzles are mounted on a manifold pipe 38, as will best be seen in FIGURES 2 and 7. There is an arcuate manifold on each side of the sprayer and, as will be seen hereinafter, the liquid supply to each of these manifolds can be selectively controlled by the tractor driver.

Turning now to FIGURES 2, 3 and 7, it will be seen that the input shaft 34 extends axially through compartment 32 and is supported therein on bearing in a support frame that is desigated at 40. On one side of support frame 40 shaft 34 carries pulley means 42, and these pulley means are connected by belts 44 with smaller pulley means 46 mounted on the input shaft of a multiple piston high pressure pump 48.

On the opposite side of support member 40 shaft 34 carries a relatively large pulley means 50 which is connected by belts 52 with a smaller pulley means 54. Pulley means 54 is arranged for driving the blower shaft 56, as will be described more fully hereinafter.

A still further driving connection is established within compartment 32 by a sprocket or pulley 58 mounted on the end of the shaft of pump 48 opposite the end which carries pulley 46. Sprocket or pulley 58 is drivingly connected with a somewhat larger sprocket or pulley 60 mounted on the end of an agitator member 62 that extends axially through tank 20 and is operable for maintaining the material therein in properly admixed condition.

The proper speeds of operation of the pump, the blower shaft and the agitator are obtained by selecting the pulleys and the like of the proper relative size so that all of the devices of the sprayer can be operated from a single input shaft.

The aforementioned pump 48 has its suction side connected by conduit 64 with a lower portion of tank 22, while the discharge side of the pump is connected to a conduit 66. This conduit has therein an adjustable valve 68 which, when opened by excessive pressure, permits the pump discharge back to the tank through a conduit 70. Normally relief valve 68 causes all of the pump discharge to be delivered to a conduit 72 in which is a fitting 74, such as a T or the like and which can be availed of for making a connection to the discharge side of the pump of a hose leading to a spray gun. Such a hose is designated at 76 in FIGURE 7 and terminates in a normally operable spray gun 78.

The conduit 72 leads to a flexible hose 80 of such length to be positioned on the tractor adjacent the operator's position thereon. This hose is adapted for selective connection with hoses 82 and 84 by operation of the valves 86 and 88 respectively. The last mentioned hoses 82 and 84 are connected to conduits that lead to the rear of the machine and are individually connected to the two manifolds 38 on the opposite sides of the sprayer. By manipulation of the valves 86 and 88 liquid can be supplied to both of the manifolds 38 or to either one thereof, and the liquid supplied to both can be interrupted.

Returning to the drive for the blower, reference may be had to FIGURES 2, 3, 4 and 5 wherein it will be seen that pulley 54 is freely rotatable on shaft 56 on sleeve bearing 90. One part 92 of a clutch unit is fixed to pulley 54 and a second part 94 of the clutch is slidably keyed to shaft 56 by key 96. An operating lever 98 having a forked end engaging clutch member 94 is operable for drivingly interconnecting clutch members 92 and 94 or for disengaging clutch 94 from member 92. Shaft 56 can thus be selectively clutched to or unclutched from drive pulley 54.

Shaft 56 is supported adjacent pulley 54 by bearing means 100 carried in a member 102 that is attached to the end of a tube 104 but extends completely through the tank from end to end and which is welded to the end walls of the tank. The end walls are stiffened to provide support for tube 104 as by the V-shaped grooves 105 formed in the end walls and preferably extended laterally thereacross, as will be seen in FIGURE 3.

At the blower end of the shaft 56 tube 104 extends a substantial distance outwardly from the adjacent end wall of tank 20 and carries a cap member 108 in which is mounted anti-friction bearing means 110 that rotataby support shaft 56 and which also sustain the end thrust imposed thereon by the rotation of the proposed type fan element 112 carried by the shaft 56 on the end thereof. Fan element 112 rotates inside ring 114 and draws air axially into the end of the sprayer unit and which air then passes substantially radially outwardly through the aforementioned discharge opening means 26. This air movement is indicated by the arrows 116 in FIGURE 7.

On account of the high velocity of the incoming air, the bottom of the opening in which the fan element runs is protected against the picking up of dirt and twigs and the like by a pivotal element 118 extending backwardly from the sprayer and extending laterally across the bottom thereof.

FIGURE 6 also illustrates the manner in which the size of the air discharge opening 26 can be adjusted to provide for different characters of the air blast issuing therefrom. In FIGURE 6 the plate members 120 are provided slidably mounted on the sprayer on opposite sides of the discharge opening means 26 and movable axially so as variably to restrict the opening. These plates could take the form of single plates, one on each side of the opening, and on each side of the sprayer and they can be employed in combination with the deflector means 28. These plate means can be provided with adjusting handles 122 by means of which the plates can be adjusted to the desired position.

It is also contemplated that these plates might be completely closed in order to unload the fan element under certain circumstances, or the plates on one side of the sprayer could be closed and those on the other side would be left open so that all of the broken air would necessarily pass out on the open side of the sprayer.

A fan element could also be unloaded by preventing air from reaching the fan, and this could be accomplished by the lid or cover member 124 adapted for being clamped over the same inlet opening as by the studs and wing nuts 126.

The character of the input shaft 34 of the sprayer with the power take off member 130 of the tractor is illustrated in FIGURE 8. In this figure the propeller shaft is designated at 132 and has a universal joint 134 at the sprayer end and a universal joint 136 at the tractor end. Universal joint 134 is connected with a smaller tube 138 forming a part of the propeller shaft which telescopes into a larger tube 140 of the propeller shaft which is connected with universal joint 136. The tubes 138 and 140 are internally and externally splined at 142 and 144 respectively, and these splines are drivingly interconnected by the balls 146. This arrangement provides for a driving connection of tube 140 with tube 138 but prevents free telescoping therebetween so that there is not any angular loading imposed on the propeller shaft at any time, even though the tractor drawing the spray equipment might be required to make an extremely short turn, which would, of course, require adjustment of the length of the propeller shaft to avoid such angular loading.

The equipment according to the present invention is thus compact and freely maneuverable, and does not require an expensive power plant to be incorporated directly therein, but instead uses the adequate power available from the tractor by means of which the equipment is being drawn. The sprayer is reduced in price on account of not requiring its own power plant and is also reduced in size for the same reason, and the difficulty of maintaining a power plant in first class operating condition when it sets idle for considerable time, as is the case of a sprayer mounted power plant, is avoided.

It will be understood that this invention is susceptible to modification in order to adapt it to different usages and conditions; and accordingly, it is desired to comprehend such modifications within this invention as may fall within the scope of the appended claim.

We claim:

In a compact tractor drawn and tractor powered sprayer; a wheel supported chassis, a single propeller type blower means mounted on the rear end of the chassis and having a rearwardly opening axial inlet and radially opening circumferential outlet means, an outwardly flaring curved air deflector extending forwardly of the blower to the forward edge of the outlet means, a tank on the chassis immediately forward of the blower means, a pump on the chassis forward of the tank having its suction side connected to the tank and having input shaft means, an arcuate manifold surounding said flaring deflector on each side of the sprayer disposed in the respective outlet means and having nozzle means distributed therealong, conduit means connecting the outlet side of said pump to said manifold means and including control valves for selectively controlling the supply of material to said manifolds, a tube extending longitudinally of the chassis through said tank and sealingly fixedly connected to the end walls of the tank, a blower drive shaft journaled in said tube and supporting the propeller of said blower means at the rear end, means at the front of the chassis for hitching it to a tractor, a flexible extensible propeller shaft having means at the front end for connection to the power take off of the tractor and extending rearwardly along the chassis to the region of the pump input shaft and the front end of the blower drive shaft, pulley and belt drive means connecting the rear end of the propeller shaft with the pump input shaft, pulley and belt drive means connecting the rear end of the propeller shaft with the said blower drive shaft, and slide plate means carried by the sprayer adjustable relative to said outlet means for controlling the outlet means in the region of each manifold individually from completely closed to full open condition.

References Cited by the Examiner

UNITED STATES PATENTS

| | | | |
|---|---|---|---|
| 364,945 | 6/87 | Medart | 192—66 |
| 754,066 | 3/04 | Hoffmann | 64—23 |
| 2,349,624 | 5/44 | Higgins | 192—66 |
| 2,374,955 | 5/45 | Raper | 239—77 |
| 2,454,339 | 11/48 | Potts et al. | |
| 2,587,965 | 3/52 | Campbell | 239—77 X |
| 2,639,940 | 5/53 | Fish | 239—78 |
| 2,661,242 | 12/53 | Kurzbin | 239—77 |
| 2,671,690 | 3/54 | Ehrenkrook | 239—77 |
| 2,849,174 | 8/58 | Spreng | 239—77 |
| 2,975,543 | 3/61 | Funk | 239—77 |
| 3,097,794 | 7/63 | Dawson | 239—78 |

FOREIGN PATENTS

| | | |
|---|---|---|
| 227,444 | 3/60 | Australia. |
| 227,668 | 4/60 | Australia. |
| 1,268,566 | 6/61 | France. |
| 13,568 | 2/56 | Germany. |
| 729,209 | 5/55 | Great Britain. |
| 914,011 | 12/62 | Great Britain. |
| 532,894 | 9/55 | Italy. |

OTHER REFERENCES

John Deere 50 Skid Sprayer Operator's Manual, OM-B25043B, received in Patent Office Feb. 2, 1962.

EVERETT W. KIRBY, *Primary Examiner.*